J. P. Gallagher,
Hydrant.

N°. 41,144.          Patented Jan. 5, 1864.

Witnesses:
E. A. Steele
H. O. Clifton

Inventor:
Joseph P. Gallagher

UNITED STATES PATENT OFFICE.

JOSEPH P. GALLAGHER, OF ST. LOUIS, MISSOURI.

IMPROVEMENT IN HYDRANTS.

Specification forming part of Letters Patent No. 41,144, dated January 5, 1864.

*To all whom it may concern:*

Be it known that I, JOSEPH P. GALLAGHER, of the city and county of St. Louis, and State of Missouri, have invented certain new and useful Improvements in Hydrants; and I do hereby declare that the following is a full and clear description thereof, reference being had to the accompanying drawings, and to the letters of reference marked thereon, and made to form a part of this specification.

This invention relates to a certain arrangement of water and waste pipes, in combination with a valve and chamber, all being so constructed and arranged to operate as to permit the water at proper times to escape or waste from the delivery-pipe, thereby preventing damage to the hydrant by freezing, as hereinafter set forth and represented.

Figure 1:
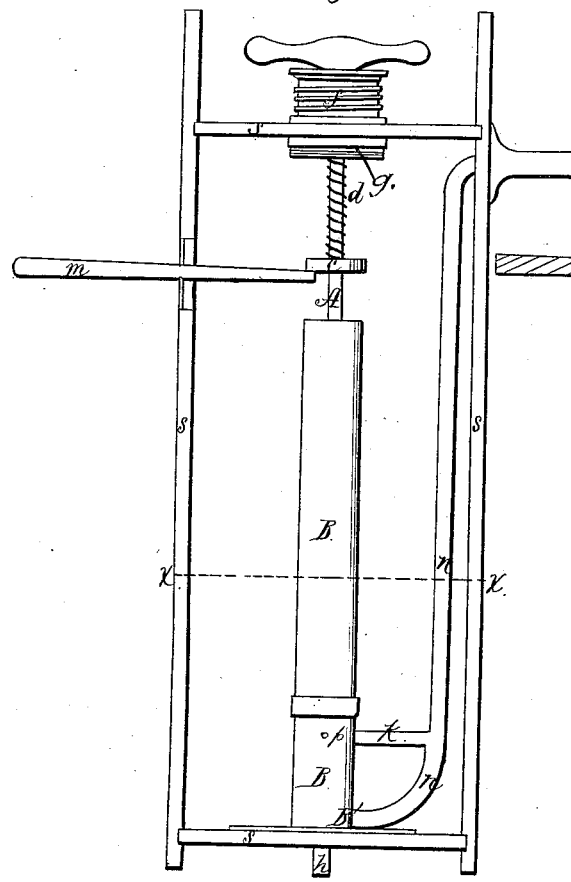
Figure 2:
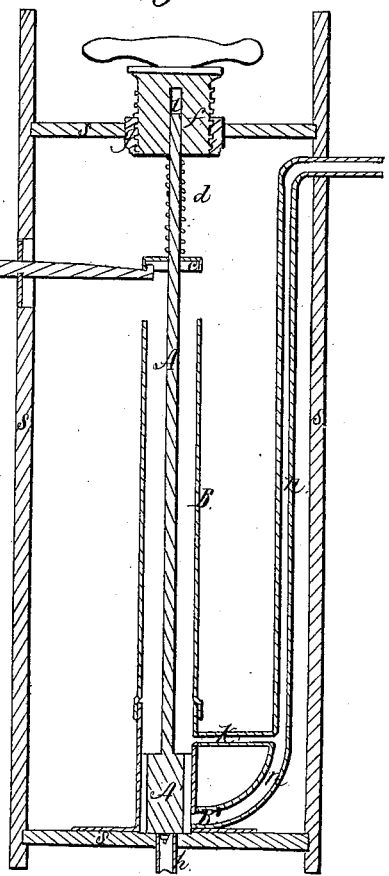

In reference to the accompanying drawings, Figure 1 is a plain side elevation, and Fig. 2 a vertical sectional elevation, representing my improvement.

A represents the valve-stem or plunger, the lower end of which will be provided with a suitable valve, A', which is adapted to work water-tight in the chamber B.

$c$ represents a disk secured to the plunger A.

$d$ is a spiral spring arranged upon the plunger above the disk $c$.

$f$ represents a screw, which is adapted to work in the nut $g$ and bear upon the said spring $d$. It is formed with a recess, $i$, (distinctly seen in Fig. 2,) which is adapted to receive the upper end of the plunger A. It will now be readily seen that the said spring when properly compressed, with its upper end bearing against the screw $f$ and its lower end against the disk $c$ of the plunger, is adapted to force the plunger downward in such manner as to hold the valve A' firmly in its seat, thereby closing the supply-pipe $h$ and preventing the flow of water. The said plunger may be elevated so as to permit the flow of water, when desired, by means of the lever $m$.

$n$ represents the delivery-pipe communicating with the valve-chamber B, at B', and extending thence upward to a suitable point at which to discharge water.

$k$ is the waste-pipe communicating with the pipe $n$, and also with the chamber B above the position of the valve A' when the same is closed.

$p$ represents an opening in the valve-chamber above the closed position of the valve, through which the waste-water may escape. The said chamber P is made to extend somewhat above the point (red line, $x$ $x$) where the hydrant enters the ground, so that said chamber is not liable to be filled with mud or other obstructions when the plunger may be removed for repairs or other purposes.

It will now be plainly seen that, as the plunger may be elevated so as to permit the water to flow from the supply-pipe through the pipe $n$, the valve A' will be actuated in such manner as to close the pipe $k$ and the opening $p$, and thereby prevent any waste of water, and that when said valve returns again to its seat the supply-pipe will be closed and the waste-pipe and opening $p$ opened, thereby permitting the water that may be in the delivery-pipe $n$, above the point where there is danger of freezing, to escape and pass off into the ground. A suitable wooden or metallic case or frame, as S, may be provided, as is used with hydrants in common use.

I do not wish to confine myself in the use of my improvement entirely to hydrants, as I am aware that it is equally adapted to employment in water-closets, bath-rooms, &c.; but,

Having thus described my invention, what I claim as new, and desire to secure by Letters Patent, is—

The arrangement of the pipes $n$ $k$, in combination with the chamber B, valve A', and opening $p$, all being constructed and arranged to operate substantially as and for the purposes set forth.

In testimony of which invention I have hereunto set my hand and seal this 7th day of November, 1863.

JOSEPH P. GALLAGHER. [L. S.]

In presence of—
E. A. SKEELE,
H. E. CLIFTON.